Patented Feb. 8, 1938

2,107,316

UNITED STATES PATENT OFFICE

2,107,316

ESTER-CONTAINING LUBRICANTS AND PROCESS OF MAKING THE SAME

Peter J. Wiezevich, now by judicial change of name Peter J. Gaylor, and Luther B. Turner, Elizabeth, N. J., assignors to Standard Oil Development Company, a corporation of Delaware No Drawing. Application September 20, 1933, Serial No. 690,235

13 Claims. (Cl. 87—9)

This invention deals with the preparation of superior lubricants. More specifically, it concerns the production of thickened and stabilized organic esters which may be used as lubricants or as blending agents in lubricating mixtures.

Suitable raw materials for this purpose are the animal, vegetable, or fish oils, synthetic esters of mono or polyhydroxy compounds such as those obtained by esterifying alcohols, glycerol or glycol with acids obtained by the oxidation of wax, ricinoleic acid, stearic acid, and the like, or other organic esters such as dibutyl phthalate, tricresyl phosphate, ethyl dibenzyl malonate, butyl acetyl ricinoleate, ethyl linoleate, methylcyclohexanol stearate, normal butyl oleate, benzyl benzoate, ethyl abietate, o-benzoyl benzoic isopropyl ester, and the like. These are merely examples, since any organic ester is suitable for this purpose. It is preferable, however, to employ an ester having a boiling point above 400° F.

The thickening may be effected either by heating the compound (heat treatment), or by subjecting it to the silent electric discharge (electric treatment or voltolization). The unsaturated esters such as those of polyhydroxy compounds as for example linseed oil, glycol oleate, rapeseed oil, menhaden oil, or the like are preferably thickened by continued batch heating at 500–700° F. using nitrogen or hydrogen gas as a means of agitation, bubbling said gas through the oil as it is heated. Catalysts such as clay, charcoal, bauxite, metallic soaps, and the like may be added during this operation. The thickening process may also be accelerated by passing the glyceride through a tube heated at 500–1400° F., the time of heating being regulated by the temperature; that is, the higher the temperature, the lower the time of contact in the heated zone. This varies somewhat with the type of stock treated. For linseed oil, a time of heating of 8–10 hours at 570° F. in a glass vessel gives a very desirable product. A similar effect is obtained by passing the oil through a glass or aluminum tube at 1200° F. with 2–5 seconds time of contact. The presence of metallic soaps will accelerate the reaction to a great extent in many cases. Pressure polymerization at elevated temperatures alone or in the presence of steam, hydrogen, or other agents can also be employed.

Mixtures of the different fatty oils or synthetic esters may be used as raw materials for the thickening operation, and they may be admixed with mineral oils, aromatic compounds, and other materials prior to polymerization. Although a temperature of 570° F. is most desirable in batch operation, lower temperatures in the neighborhood of about 390° F. and higher temperatures even in the range of 1470–1650° F. may be reached, depending upon the type of process used. The agitation may be mechanical, although gases or vapors such as nitrogen, steam, air, ammonia, formaldehyde, and the like may be employed. In many cases, especially those employing air or ammonia, the agitating gas or vapor appears to react with the material treated. However, when nitrogen is employed for agitation, the oil undergoes a decomposition due to the heat alone, giving off volatile vapors containing aldehydes and water, which apparently produces some unsaturated residues in the reaction mixture, causing a gradual thickening or "polymerization" of the oil. Excessive destruction of the molecule or cracking beyond the stage necessary for thickening is to be avoided, except in cases where it is simultaneously accompanied by hydrogenation. Although the products may be volatile to some extent, it is preferred to produce thickened "polymers" which will not distil over under moderate vacuum (say 10–20 m. m. of mercury) without substantial decomposition. It is also advantageous to keep the acidity of the product below 50 mgs. KOH per gm. of oil. This is accomplished by titrating samples at various intervals during the heating period.

Polymerization by voltolization is suitable for both saturated and unsaturated esters. The more saturated esters such as tricresyl phosphate, dibutyl phthalate, ethyl dibenzyl malonate, butyl oleate, and the like, are more advantageously thickened in this manner. The operation is generally carried out at 5–20 m. m. vacuum, 6,000–10,000 volts, 60–500 cycles, and room temperature, although temperatures as high as 600° F. may be employed.

After thickening by either one of the above methods, the product is unsaturated and must be stabilized to produce the most desirable lubricant. By the term "stabilization" is meant the improvement of the product in resisting deterioration usually encountered under lubricating conditions. This is accomplished either by hydrogenation in the presence of an active catalyst, by halogenation, addition of sulfur, condensation with other organic compounds, or the like. When hydrogenation is employed the temperature may be increased if the material is already insoluble or only slightly soluble in mineral oils due to excessive polymerization or oxidation. Such a treatment removes some of the oxygen, and if the temperature is sufficiently high, causes substantial cracking to lower molecular weight products. A solvent such as cyclohexane, tetraline, and the like may be used to facilitate agitation, although generally this is not necessary, the procedure being merely to mix the active catalyst with the polymer, and to agitate in the presence of hydrogen at 20–200 atmospheres pressure, maintaining a temperature of 200–480° F. during the operation. With highly active catalysts even lower temperatures and pressures may be employed. The types of catalysts used for this purpose are the active metallic materials such as finely divided nickel or copper chromite. A very satisfactory one is obtained by treating a finely pulverized nickel-aluminum alloy with caustic soda solution.

Before the hydrogenation step the oils may be neutralized by washing with alkali. This step is especially desirable when a solvent is subsequently employed. Complete hydrogenation can be effected in this manner. However, for the purpose of the invention, only the active unsaturation need be hydrogenated. Since this treatment generally raises the pour point, it is preferable to leave sufficient unsaturation in the product to give the desired pouring qualities. In some cases, as previously pointed out, the thickened oil may be soluble only in Coastal oils and not in Pennsylvania stocks, or even insoluble in both. In such an event, the solubility may be increased by subjecting the thickened product to a more destructive hydrogenation in which some oxygen may be removed. This may be carried out at 350–950° F. in the presence of more resistant catalysts, such as the oxides and sulfides of the metals in the VI Group of the Periodic Table.

The hydrogenation of some thickened esters, notably the glycerides, causes the formation of a suspended waxy material. It can be readily removed by diluting the product with 4–10 times its volume of a light solvent such as ethyl ether, naphtha, propane, acetone, trichlorethylene, and the like, chilling the solution, and separating by settling, centrifuging, and the like, the clarified supernatant layer from which the solvent is removed by distillation. The amount of cooling required depends upon the amount of solids to be left in the oil. Generally, temperatures in the neighborhood of 0° F. are satisfactory, although cooling to −40° F. or lower may be resorted to in order to obtain a free-pouring, non-clouding oil. To obtain the most desirable results, the iodine number of the finished material should be below 85 for the product from drying oil types of stocks, and preferably below 50 for those from the more stable raw materials.

The oils so prepared may be used directly as lubricants in which case their solubility in mineral oils is not of much importance, or they may be blended with other oils in order to improve the properties of the latter. If the product is to be used as a thickener for other oils, it is desirable to carry out the polymerization as far as possible before hydrogenation. There is a limit, however, above which it is not desirable to go, which is generally indicated by (1) low solubility of the product in mineral oils, (2) exceptionally high free acid formation, and (3) intensely dark color. For blending purposes, it is desirable not to allow the thickened ester to become insoluble in mineral oils at temperatures above 30° F., and in many cases even lower.

These thickened esters may be blended with vegetable, animal, fish, mineral, or synthetic oils or esters, to produce blends suitable for various lubricating purposes. Due to their high viscosity indices and excellent oiliness, the thickened glycerides are especially suitable for improving the properties of Coastal oils, white oils, hydrogenated oils, or other oils of this type. They may be added to Pennsylvania oils to produce blends of unusually good viscosity and lubricating characteristics.

The following examples serve to show some of the types of products which may be prepared according to this invention:

Example 1

Linseed oil which had been thickened by heating in a glass vessel at 575° F. for 10 hours with nitrogen as the agitating agent, was partially hydrogenated in presence of an activated nickel catalyst at 2000 pounds per square inch hydrogen pressure and at a temperature of 212–225° F. The resulting product was thick at room temperature and possessed a granular appearance. In order to remove the solid suspended matter, the oil was dissolved in 5 volumes of ether, cooled to −40° F. and filtered. After settling for about 2 hours some high melting solid separated out, and the decanted oil had only a slight cloud and poured at room temperature. It was light colored, and miscible with Pennsylvania oil in all proportions producing excellent blended lubricants. The following inspection data on the hydrogenated product were obtained:

| | |
|---|---|
| Viscosity at 210° F. | 1175 seconds S. U. |
| Viscosity at 150° F. | 3969 seconds S. U. |
| Viscosity index | 124 |
| Iodine number | 83 |

The viscosity index referred to above is the relative measure of the effect of temperature upon viscosity as described by Dean and Davis in Chem. and Met. Eng. 36, 618 (1929).

Example 2

Di-N-butyl phthalate has the following properties:

| | |
|---|---|
| Viscosity at 100° F. | 57.5 sec. |
| Viscosity at 210° F. | 34 sec. |
| Pour | −50° F. |
| Flash | 310° F. |
| Conradson carbon | .002% |
| Boiling point | 650° F. (approx.) |

It was subjected to the action of the silent electric discharge at about 8000 volts, 60 cycles, 5–20 m. m. vacuum, and room temperature for a period of several hundred hours, after which it was found to have the following properties:

| | |
|---|---|
| Viscosity at 100° F. | 167 sec. |
| Viscosity at 210° F. | 43 sec. |
| Iodine number | 11.3 |
| Acid number | 29.72 |

This product was found to be an excellent lubricant, being still more stable after hydrogenation, and neutralization of the acidity. It was soluble in mineral oils, improving their lubricating properties.

Example 3

Soya bean oil having a viscosity of about 54 seconds at 210° F. was heated to 572° F. in a glass vessel for 24 hours while blowing with nitrogen, when the viscosity reached 520 seconds at 210° F. The product was then hydrogenated at 200° F. without any solvent, employing mechanical agitation and a nickel-sodium carbonate catalyst. After filtration and separation of the waxy solid material according to the method shown in Example 1, an excellent blending agent for lubricants was obtained.

*Example 4*

Whale oil was heated in a glass vessel at 572° F. for 5½ hours, using air for agitation. The product, which had a viscosity of 2562 seconds at 210° F., was destructively hydrogenated at 480–660° F. under a pressure of 1500 lbs. per sq. in. in presence of a molybdenum sulfide catalyst. The resulting mixture was then refluxed with amyl alcohol in the presence of a small amount of catalyst until most of the free acid was esterified, and the whole mixture was diluted with 4 volumes of naphtha and filtered through attapulgus clay. The filtrate was freed of the solvent by distillation, and was found to be a very suitable lubricant, giving an exceptionally stable aviation oil when blended with 70% of Pennsylvania oil of 80 seconds viscosity at 210° F.

*Example 5*

A sample of heat thickened linseed oil having an iodine number of 170 was hydrogenated in presence of a nickel catalyst to an iodine number of 70. The solid cloud-producing material was removed as in Example 1, giving a product sufficiently stable for use as a blending agent in lubricants. A 5% solution of this material in a Coastal oil of 43 seconds viscosity at 210° F. and viscosity index of −17, showed that the hydrogenation had not appreciably affected the blending properties of the polymer. The following are the data for the blends:

|  | Viscosity at 100° F. | Viscosity at 210° F. | Viscosity index |
|---|---|---|---|
| Coastal+unhydrogenated polymer | 640 | 63.4 | 64 |
| Coastal+hydrogenated polymer | 606 | 61.6 | 63 |

Upon standing, the unhydrogenated polymer was soon affected by the air, forming a thick film on the surface of the oil. On the other hand, the hydrogenated polymer showed no such film even after standing over extended periods of time.

*Example 6*

Rapeseed oil having a viscosity of 56 seconds at 210° F. was subjected to electric treatment at 8000 volts, 60 cycles and 4 m. m. vacuum for 310 hours when the viscosity was found to be 387 seconds at 210° F. The iodine number was 80. This material was partially hydrogenated at 210° F., clay treated, and blended with 95% of a white oil of 85 viscosity at 100° F. to produce a superior textile oil.

*Example 7*

A sample of the whale oil described in Example 4 was held at 572° F. for 18½ hours, employing hydrogen as an agitating agent. The viscosity of the product was 200 seconds at 210° F. It was hydrogenated at 250° F. in presence of a nickel catalyst obtained by leaching out a pulverized aluminum-nickel alloy with caustic soda. Cyclo-hexane was employed as the solvent during the hydrogenation.

After removal of the solvent, followed by filtration and separation of the solid material at low temperature, a very satisfactory lubricant was obtained which dissolved readily in a synthetic oil obtained by the polymerization of cracked wax with aluminum chloride. A 50% blend was found very satisfactory as a motor lubricant.

*Example 8*

Cottonseed oil having a viscosity at 100° F. of 176 seconds, 53 seconds at 210° F., and an iodine number of 108 was heated at 572° F. for 24 hours while blowing with nitrogen. The viscosity increased to a value of 450 seconds at 210° F. After hydrogenation at 180 F., and filtration, the product was blended with 90% of Pennsylvania bottoms, producing an excellent steam cylinder oil.

The materials prepared according to this invention may be used in all types of lubricants, greases and the like, and may be blended in fuels, naphthas, oils, and solvents. Other blending agents, such as pour inhibitors including those prepared by the condensation of waxy materials with aromatic hydrocarbons, oxidation inhibitors similar to alpha naphthol, thio naphthols, quinones, cresols, and the like, load carrying agents such as lead or sulfur compounds, soaps, such as lead oleate, aluminum stearate, cobalt naphthenate, and the like, may also be added.

This invention is not limited by any of the above examples, or by any theory or mechanism on the action of the various ingredients, but only by the following claims which cover the process as broadly as the prior art permits.

We claim:
1. An improved process for producing valuable ester type lubricants, blending oils and the like from esters both fatty and non-fatty, saturated and unsaturated, comprising the steps of polymerizing the ester by the action of high voltage electric discharge, whereby an unsaturated and unstable polymer is obtained, then stabilizing the polymer by hydrogenation.
2. Process according to claim 1, in which the material polymerized is selected from the group consisting of animal, vegetable and fish oils.
3. An improved product comprising a polymer of an ester selected from the group consisting of animal, vegetable and fish oils, obtained by passage of high voltage electric discharge through said ester, followed by stabilization of the polymer by hydrogenation.
4. An improved process for producing valuable lubricants, blending oils and the like, comprising the steps of polymerizing an ester by voltolization, stabilizing the product so formed by a treatment selected from the class consisting of hydrogenation, halogenation, addition of sulphur and condensation with other organic compounds.
5. An improved product comprising a polymerized ester blend with mineral oil obtained by passage of high voltage electric glow discharge through said blend, followed by stabilization of said blend by hydrogenation.
6. Process according to claim 4 in which the material polymerized is selected from the group consisting of animal, vegetable and fish oils.
7. Process according to claim 4 in which the material polymerized is a synthetic ester.
8. Process according to claim 4 in which the material polymerized is an ester having a boiling point above 400° F.
9. An improved product comprising a polymer of an ester, obtained by passage of high voltage electric glow discharge through said ester, followed by stabilization of the polymer by a treatment selected from the class consisting of hy- drogenation, halogenation, addition of sulphur and condensation with other organic compounds.

10. Stabilized polymer according to claim 9 in which the said ester is selected from the group consisting of animal, vegetable and fish oils.

11. Stabilized polymer, according to claim 9, in which the said ester is a synthetic ester.

12. Stabilized polymer according to claim 9 in which the said ester is a synthetic ester containing an aromatic group.

13. Stabilized polymer according to claim 9 in which the said ester has a boiling point above 400° F.

PETER J. WIEZEVICH.
LUTHER B. TURNER.